United States Patent
Guo

(10) Patent No.: US 10,943,186 B2
(45) Date of Patent: Mar. 9, 2021

(54) MACHINE LEARNING MODEL TRAINING METHOD AND DEVICE, AND ELECTRONIC DEVICE

(71) Applicant: ADVANCED NEW TECHNOLOGIES CO., LTD., Grand Cayman (KY)

(72) Inventor: Long Guo, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 0 days.

(21) Appl. No.: 16/813,268

(22) Filed: Mar. 9, 2020

(65) Prior Publication Data

US 2020/0210899 A1    Jul. 2, 2020

Related U.S. Application Data

(63) Continuation of application No. PCT/CN2018/107499, filed on Sep. 26, 2018.

(30) Foreign Application Priority Data

Nov. 22, 2017    (CN) .......................... 201711174427.3

(51) Int. Cl.
G06F 15/18 (2006.01)
G06N 20/00 (2019.01)
G06K 9/62 (2006.01)

(52) U.S. Cl.
CPC ............. G06N 20/00 (2019.01); G06K 9/623 (2013.01); G06K 9/6256 (2013.01); G06K 9/6268 (2013.01)

(58) Field of Classification Search
CPC .... G06K 9/623; G06K 9/6256; G06K 9/6268; G06N 20/00; G06Q 10/0635; G06Q 40/04
See application file for complete search history.

(56) References Cited

U.S. PATENT DOCUMENTS

5,822,741 A * 10/1998 Fischthal ................. G06K 9/62
  706/16
6,917,926 B2    7/2005 Chen et al.
(Continued)

FOREIGN PATENT DOCUMENTS

CN    103123634 A    5/2013
CN    106778603 A    5/2017
(Continued)

OTHER PUBLICATIONS

First Search Report for Taiwanese Application No. 107132758, dated Jun. 21, 2019, 1 page.
(Continued)

*Primary Examiner* — Luis A Sitiriche

(57) ABSTRACT

A machine learning model training method includes: classifying samples having risk labels in a training sample set as positive samples and classifying samples without risk labels in the training sample set as negative samples; training a risk model with a machine learning method based on the positive samples and the negative samples; obtaining a risk score for each of the negative samples based on the trained risk model; identifying one or more negative samples in the training sample set that have a risk score greater than a preset threshold value; re-classifying the one or more negative samples in the training sample set that have a risk score greater than the preset threshold value as re-classified positive samples to generate an updated training sample set from the training sample set; and re-training the risk model with the machine learning method based on the updated training sample set.

20 Claims, 2 Drawing Sheets

(56) References Cited

U.S. PATENT DOCUMENTS

| | | | |
|---|---|---|---|
| 8,655,724 B2* | 2/2014 | Chow | G06Q 10/0635 |
| | | | 705/14.47 |
| 8,988,237 B2 | 3/2015 | Liu et al. | |
| 9,037,967 B1 | 5/2015 | Al-Jefri et al. | |
| 9,082,083 B2 | 7/2015 | Virkar et al. | |
| 9,405,900 B2 | 8/2016 | Dixit et al. | |
| 9,582,490 B2 | 2/2017 | Simard et al. | |
| 9,824,060 B2 | 11/2017 | Yacout et al. | |
| 9,836,455 B2 | 12/2017 | Martens | |
| 9,888,030 B2 | 2/2018 | Yao et al. | |
| 9,972,092 B2 | 5/2018 | Lin et al. | |
| 9,998,445 B2 | 6/2018 | Wallrabenstein | |
| 10,043,054 B2 | 8/2018 | Remiszewski et al. | |
| 10,452,992 B2 | 10/2019 | Lee et al. | |
| 2007/0112824 A1* | 5/2007 | Lock | G06N 3/126 |
| 2008/0103996 A1 | 5/2008 | Forman et al. | |
| 2009/0307028 A1* | 12/2009 | Eldon | G06Q 30/06 |
| | | | 705/37 |
| 2011/0119210 A1 | 5/2011 | Zhang et al. | |
| 2013/0231258 A1 | 9/2013 | Wilde et al. | |
| 2015/0200962 A1 | 7/2015 | Xu et al. | |
| 2016/0068915 A1 | 3/2016 | Kennedy et al. | |
| 2016/0196480 A1* | 7/2016 | Heifets | G06K 9/6267 |
| | | | 382/158 |
| 2016/0350671 A1* | 12/2016 | Morris, II | G05B 23/0229 |
| 2017/0091320 A1 | 3/2017 | Psota et al. | |
| 2017/0098172 A1 | 4/2017 | Ellenbogen et al. | |
| 2018/0012082 A1 | 1/2018 | Satazoda et al. | |
| 2018/0068083 A1 | 3/2018 | Cohen et al. | |

FOREIGN PATENT DOCUMENTS

| | | |
|---|---|---|
| CN | 106971158 A | 7/2017 |
| CN | 107798390 A | 3/2018 |
| EP | 3101599 A3 | 3/2017 |
| EP | 3161731 A1 | 5/2017 |
| WO | 2004079501 A2 | 9/2004 |
| WO | 2016004062 A1 | 1/2016 |

OTHER PUBLICATIONS

International Search Report and Written Opinion of the International Searching Authority for International Application No. PCT/CN2018/107499, dated Dec. 26, 2018, with partial machine English Translation, 9 pages.

Search Report for European Application No. 18880128.6, dated Nov. 18, 2020, 9 pages.

Wuling Ren et al., "Intelligent Detection of Network Agent Behavior Based on Support Vector Machine", Advanced Computer Theory and Engineering, IEEE, 2008 International Conference on Advanced Computer Theory and Engineering, Dec. 2008, pp. 378-382.

Le Nguyen et al., "I did not smoke 100 cigarettes today! Avoiding False Positives in Real-World Activity Recognition", Pervasive and Ubiquitous Computing, ACM, UBICOMP Sep. 2015, Osaka Japan, pp. 1053-1063.

* cited by examiner

MACHINE LEARNING MODEL TRAINING METHOD AND DEVICE, AND ELECTRONIC DEVICE

CROSS REFERENCE TO RELATED APPLICATIONS

This application is a continuation application of International Application No. PCT/CN2018/107499, filed on Sep. 26, 2018, which claims priority to and benefits of Chinese Patent Application No. 2017/11174427.3, filed on Nov. 22, 2017. The contents of the above-referenced applications are incorporated herein by reference in their entirety.

TECHNICAL FIELD

The present specification relates to the computer application field, and in particular, to a machine learning model training method and device, and an electronic device.

BACKGROUND

In the field of mobile payment, a payment platform would typically deploy, out of considerations for payment safety, a risk model constructed through supervised machine learning in a risk control system to generate risk scores on daily transactions of users, so as to promptly discover abnormal transactions of users.

When a risk model is being trained, those transactions having transaction abnormalities may often be classified as positive samples (e.g., account thefts that are actively reported by users, and the like), and the other transactions without transaction abnormalities are classified as negative samples. Then, supervised machine learning may be performed based on these positive samples and negative samples. When model training is completed, the model may subsequently be used to generate risk scores on daily transactions of users, so that the payment platform may make risk-related decisions based on the risk scores of daily transactions of users and promptly discover abnormal transactions of users.

SUMMARY

The present specification provides a machine learning model training method, comprising: classifying samples having risk labels in a training sample set as positive samples and classifying samples without risk labels in the training sample set as negative samples; training a risk model with a machine learning method based on the positive samples and the negative samples; obtaining a risk score for each of the negative samples based on the trained risk model; identifying one or more negative samples in the training sample set that have a risk score greater than a preset threshold value; re-classifying the one or more negative samples in the training sample set as re-classified positive samples to generate an updated training sample set from the training sample set; and re-training the risk model with the machine learning method based on the updated training sample set.

In some embodiments, the identifying one or more negative samples in the training sample set that have risk scores greater than a preset threshold value comprises: deleting the negative samples in the training sample set that have risk scores greater than the preset threshold value.

In some embodiments, the identifying one or more negative samples in the training sample set that have risk scores greater than a preset threshold value comprises: re-classifying the negative samples in the training sample set that have risk scores greater than a preset threshold value as positive samples.

In some embodiments, the re-training the risk model based on the positive and negative samples in the filtered training sample set comprises: configuring weights for loss functions corresponding to the re-classified positive samples and original positive samples in the training sample set, respectively, wherein a weight of the loss function corresponding to the re-classified positive samples is smaller than a weight of the loss function corresponding to the original positive samples; and training the risk model based on the re-classified positive samples, the original positive samples in the training sample set and the remaining negative samples in the training sample set.

In some embodiments, the risk scores represent probabilities at which a risk occurs; and the method further comprises: after re-classifying the negative samples that have risk scores greater than the preset threshold value as re-classified positive samples, configuring the risk scores of the re-classified positive samples as the weight of the loss function corresponding to the re-classified positive samples, and setting the weight of the loss function corresponding to original negative samples to be 1.

In some embodiments, the method further comprises: constructing a prediction sample based on online data; and obtaining a risk score of the prediction sample based on the re-trained model.

The present specification provides a machine learning model training device, comprising: a classifying module configured to classify samples with risk labels in a training sample set as positive samples and classify samples without risk labels in the training sample set as negative samples; an assessing module configured to train a risk model with a machine learning method based on the classified positive samples and negative samples, and obtain a risk score for each of the negative samples based on the trained risk model; a filtering module configured to identify one or more negative samples in the training sample set that have risk scores greater than a preset threshold value; and a training module configured to re-train the risk model with the machine learning method based on the positive and negative samples in the filtered training sample set.

In some embodiments, the filtering module is configured to: delete the negative samples in the training sample set that have risk scores greater than the preset threshold value.

In some embodiments, the filtering module is configured to: re-classify the negative samples in the training sample set that have risk scores greater than a preset threshold value as positive samples.

In some embodiments, the training module is further configured to: configure weights for loss functions corresponding to the re-classified positive samples and original positive samples in the training sample set, respectively, wherein a weight of the loss function corresponding to the re-classified positive samples is smaller a weight of the loss function corresponding to the original positive samples; and train the risk model based on the re-classified positive samples, the original positive samples in the training sample set and the remaining negative samples in the training sample set.

In some embodiments, the risk scores represent probabilities at which a risk occurs; and the filtering module is further configured to: after re-classifying the negative samples that have risk scores greater than the preset threshold value as re-classified positive samples, configure the risk scores of the negative samples as the weight of the loss function corresponding to the re-classified positive samples, and set the weight of the loss function corresponding to the original positive samples to be 1.

In some embodiments, the assessing module is further configured to: construct a prediction sample based on online data; and obtain a risk score of the prediction sample based on the re-trained model.

The present specification further provides an electronic device, comprising: a processor; and a memory for storing machine executable instructions. By reading and executing the machine executable instructions stored in the memory and corresponding to a control logic of training of a machine learning model, the processor is caused to: classify samples with risk labels in a training sample set as positive samples and classify samples without risk labels in the training sample set as negative samples; train a risk model with a machine learning method based on the positive samples and negative samples; obtain a risk score for each of the negative samples based on the trained risk model; filter negative samples in the training sample set that have risk scores greater than a preset threshold value; and re-train the risk model with the machine learning method based on the positive and negative samples in the filtered training sample set.

In another aspect, an apparatus is provided. The apparatus includes at least one processor and a memory communicatively connected to the at least one processor, wherein the memory stores instructions executable by the at least one processor to cause the at least one processor to perform operations including: classifying samples having risk labels in a training sample set as positive samples and classifying samples without risk labels in the training sample set as negative samples; training a risk model with a machine learning method based on the positive samples and the negative samples; obtaining a risk score for each of the negative samples based on the trained risk model; identifying one or more negative samples in the training sample set that have a risk score greater than a preset threshold value; re-classifying the one or more negative samples in the training sample set as re-classified positive samples to generate an updated training sample set from the training sample set; and re-training the risk model with the machine learning method based on the updated training sample set.

In yet another aspect, a non-transitory computer-readable storage medium is provided. The non-transitory computer-readable storage medium stores instructions executable by a processor to cause the processor to perform operations including: classifying samples having risk labels in a training sample set as positive samples and classifying samples without risk labels in the training sample set as negative samples; training a risk model with a machine learning method based on the positive samples and the negative samples; obtaining a risk score for each of the negative samples based on the trained risk model; identifying one or more negative samples in the training sample set that have a risk score greater than a preset threshold value; re-classifying the one or more negative samples in the training sample set as re-classified positive samples to generate an updated training sample set from the training sample set; and re-training the risk model with the machine learning method based on the updated training sample set.

The technical solutions according to some embodiments of the present specification classify samples with risk labels in a training sample set as positive samples and classify samples without risk labels in the training sample set as negative samples; train a risk model with a machine learning method based on the positive samples and negative samples, and assess a risk of the negative samples respectively based on the trained model to obtain risk scores for the negative samples; then, filter negative samples in the training sample set that have risk scores greater than a preset threshold value as suspected positive samples; and re-train the risk model with the machine learning method based on the positive and negative samples in the filtered training sample set.

On the one hand, suspected positive samples in the negative samples in the training sample set can be found and filtered out, which improves the classifying accuracy of the positive and negative samples in the training sample set. On the other hand, the positive and negative samples in the filtered training sample set are used to re-train the model, which is favorable for improving the performance of the trained model.

DETAILED DESCRIPTION OF EMBODIMENTS

Figure 1:
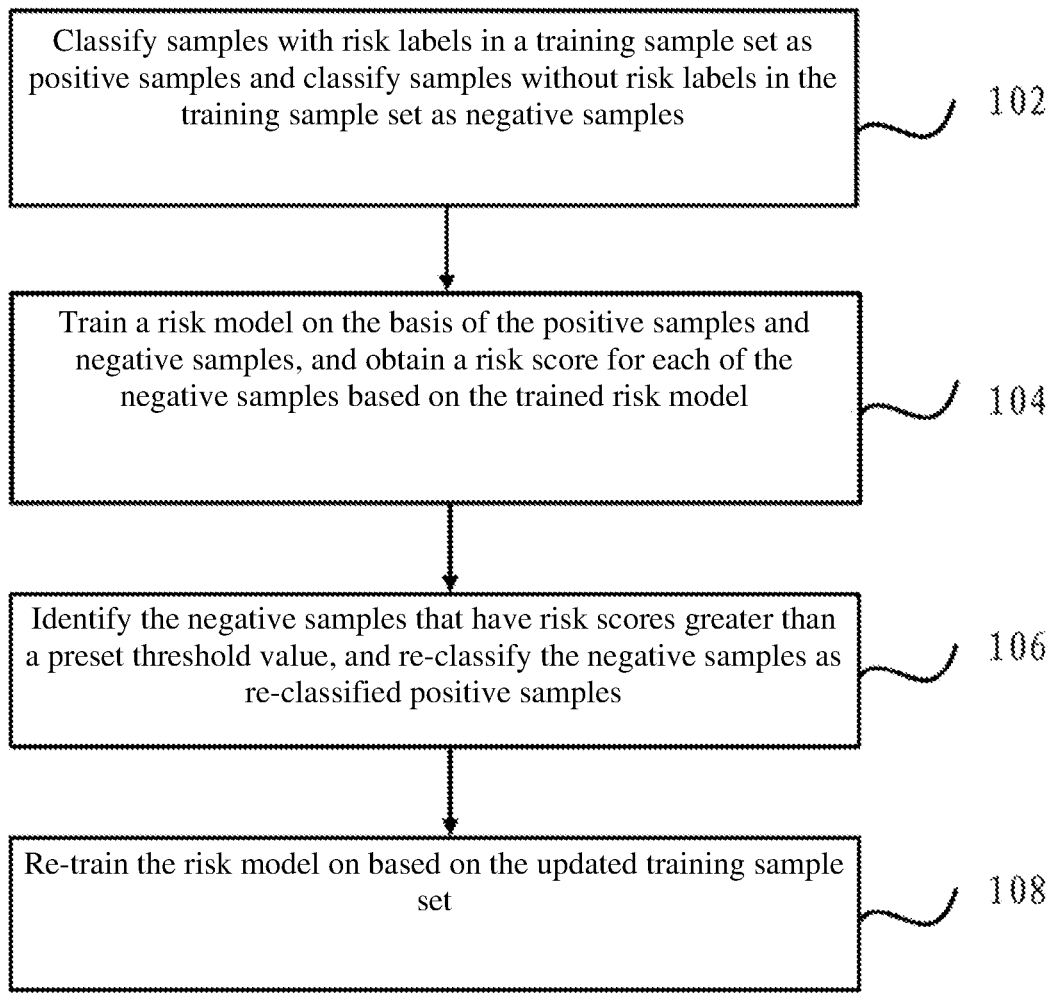
FIG. 1 is a flow chart of a supervised machine learning model training method according to some embodiments of the present specification.

Exemplary embodiments will be described in detail below, and the examples of the embodiments are illustrated in the accompanying drawings. When the description below involves the accompanying drawings, identical numbers in different drawings represent identical or similar elements, unless otherwise indicated. The embodiments described in the following exemplary embodiments do not represent all embodiments that are consistent with the present specification. Conversely, they are only examples of devices and methods that are consistent with some aspects of the present specification as set forth in detail in the appended claims.

Terms used in the present application are only for the purpose of describing particular embodiments, rather than limiting the present specification. "A," "the," and "said" in the singular form used in the present specification and the appended claims are intended to include the plural form as well, unless clearly indicated in the context to have other meanings. It should also be understood that the term "and/or" used in the present specification refers to and includes any or all possible combinations of one or more associated listed items.

It should be understood that terms such as first, second, third, and the like may be used in the present specification to describe various information, but the information shall not be limited to these terms. These terms are only used to differentiate information of the same type from each other. For example, without departing from the scope of the present specification, first information may also be referred to as second information, and similarly, second information may also be referred to as first information. Depending on the context, the term "if" used herein may be construed as "when . . . " or "at the time of . . . " or "in response to determination."

When a supervised machine learning model is being trained, the classifying accuracy of training samples typically directly determines the accuracy of the trained model. Therefore, in the model training phase, how to improve the classifying accuracy of training samples to improve the accuracy of the trained model is significantly important.

For example, training a supervised risk model can be based on users' historical transaction data. When the risk model is being trained, the transactions in which risk events occurred (e.g., a user actively reports asset losses occurred in the user's transactions) may often be classified as positive samples, and the other transactions in which no risk events occurred are classified as negative samples. However, there may typically be some transactions in which risk events occurred but not actively reported by users. This may lead to cases where some positive samples are mixed in negative samples in a training sample set. If a modeler directly uses this training sample set to train a model, the accuracy of the model would inevitably be affected. Therefore, if the modeler can promptly find and filter out suspected positive samples mixed in the negative samples, the accuracy of the trained model can be significantly improved.

In view of the above, the present specification improves a conventional model training process that is based on pu-learning and provides a technical solution as follows: classifying unlabel samples (samples without labels) as positive samples to train a supervised machine learning model, and assessing the risk of negative samples in the training sample set using the trained supervised machine learning model to find and filter out suspected positive samples in the negative samples in the training sample set, thereby improving the classifying accuracy of the positive and negative samples in the training sample set.

During implementations, a training sample set comprising a plurality of samples with risk labels and a plurality of samples without risk labels may be obtained in advance. The samples with risk labels in the training sample set are classified as positive samples, the unlabel samples without labels in the training sample set are classified as negative samples, and then a supervised machine learning model is trained based on the classified positive samples and negative samples.

When the model training is completed, the risk of the negative samples in the training sample set may further be assessed, respectively, based on the supervised machine learning model to obtain risk scores for the negative samples. The negative samples in the training sample set that have risk scores greater than a preset threshold value are then selected through screening. And the selected negative samples are filtered out as suspected negative samples from the training sample set.

For example, in one embodiment, the negative samples that have risk scores greater than the preset threshold value may be directly deleted from the training sample set. Alternatively, in another embodiment, the negative samples that have risk scores greater than the preset threshold value may also be classified as suspected positive samples and re-classified as positive samples. A weight may be set for the loss function corresponding to the re-classified positive samples, wherein the weight of the loss function corresponding to the re-classified positive samples is smaller than the weight of the loss function corresponding to the original positive samples.

After the suspected negative samples in the training sample set have been filtered, the supervised machine learning model may be re-trained based on the positive samples and negative samples in the filtered training sample set, to construct a risk model.

On the one hand, suspected positive samples in the negative samples in the training sample set can be found and filtered out, which improves the classifying accuracy of the positive and negative samples in the training sample set.

On the other hand, the positive and negative samples in the filtered training sample set are used to re-train the model, which is favorable for improving the performance of the trained model.

The present specification will be described below with reference to exemplary embodiments and exemplary application scenarios.

Referring to FIG. 1, FIG. 1 illustrates a supervised machine learning model training method according to some embodiments of the present specification. The method comprises steps 102, 104, 106, and 108:

In step 102, samples with risk labels in a training sample set are classified as positive samples and samples without risk labels in the training sample set are classified as negative samples.

In step 104, a supervised risk model is trained based on the classified positive samples and negative samples, and a risk of the negative samples is assessed based on the trained model to obtain risk scores for the negative samples.

In step 106, negative samples in the training sample set that have risk scores greater than a preset threshold value are filtered/identified.

In step 108, the supervised risk model is retained based on the positive and negative samples in the filtered training sample set.

The above risk model may, for example, comprise a machine learning model trained according to a supervised machine learning method and based on training samples in a preset training sample set. The type of the above risk model is not particularly limited in the present specification, and a risk model of any type may be included in exemplary applications.

For example, in a scenario, the above risk model may be a risk model that is trained based on a training sample set constructed with users' historical transaction data and is used for assessing risks of daily transactions of the users. With this risk model, the risk of a transaction initiated by a user may be assessed to obtain a corresponding transaction risk score, and then the transaction risk score may be further used to decide if this transaction initiated by the user involves a risk.

For example, in another scenario, the above trained model may also be a credit model that is trained based on a training sample set constructed with user data, such as users' historical transaction records, default records, and repayment records, and is used for assessing risks of user credits. With this credit model, the risk of a user's credit may be assessed to obtain a corresponding credit risk score. The credit risk score may be further used to decide if this user is a user with high risks who may have risky actions, such as credit default and the like.

The technical solutions of the present specification will be described in detail below. For example, the above risk model can be a risk model for assessing the risk of a transaction initiated by a user.

It should be noted that the above risk model being used as a risk model for assessing the risk of a transaction initiated by a user is provided as an example. In exemplary applications, the above risk model may also be a supervised risk model of other types (e.g., a credit model), which is not particularly limited in the present specification.

In the present specification, a modeler may collect a lot of users' historical transaction data in advance, extract transaction characteristics in a plurality of dimensions from the collected historical transaction data as modeling characteristics, which are used to construct characteristic vectors as training samples. And based on these training samples, a characteristic matrix is constructed as a training sample set.

Here, the modeling characteristics used for constructing training samples may encompass any form of characteristics related to user transaction risks, which is not particularly limited in the present specification. For example, the modeling characteristics may comprise transaction characteristics in dimensions such as whether a user logs in at a different location, transaction time, transaction amount, and the like.

When a training sample set has been constructed, the modeler may respectively classify, based on information actively fed back by users, training samples in the training sample set, in which risk events occurred, with corresponding risk labels. At this point, the remaining training samples without risk labels are unlabeled samples.

After the modeler has classified the training samples in the training sample set, in which risk events occurred, with risk labels, the training samples with the risk labels may be classified as positive samples. The remaining unlabel samples without risk labels may be classified as negative samples. Then, the above risk model may be constructed by training a preset supervised machine learning model based on these positive samples and negative samples in the training sample set.

Here, a type of the above supervised machine learning model is not particularly limited in the present specification. For example, the above machine learning model may be a Logistic Regression (LR) model or a supervised machine learning model in other forms.

In exemplary applications, the supervised machine learning model typically uses a loss function to describe a fitting error between training samples and corresponding sample labels. In an exemplary model training process, training samples and corresponding sample labels may be input into the loss function for iterative operations, until the algorithm converges to obtain, through reverse solution, values of model parameters when the fitting error between training samples and corresponding sample labels is minimum. Namely, a process of training a supervised machine learning model through a loss function may be understood as a process of obtaining, with a loss function and reverse solution, values of optimal model parameters when the fitting error between training samples and corresponding sample labels is minimum.

After values of model parameters are obtained when the fitting error between training samples and corresponding sample labels is minimum, the model training is completed. At this point, the trained model is a risk model for assessing risks of daily transactions of users.

In the present specification, there may typically be some transactions in which risk events occurred but not actively reported by users in the historical transaction data collected by a modeler for constructing training samples in exemplary applications. This may lead to cases where some suspected positive samples may be mixed in the negative samples without risk labels in the above training sample set. Therefore, to further improve the accuracy of the classified positive samples and negative samples in the above training sample set, when the above risk model training is completed, the modeler may identify and filter out suspected positive samples in the negative samples in the training sample set by further assessing the risk of the negative samples in the above training sample set respectively using the risk model.

In implementations, when the above risk model training is completed, the modeler may use the negative samples in the original training sample set as prediction samples, input a prediction sample into the risk model for risk assessment to obtain a corresponding risk score, and then screen out negative samples in the training sample set that have risk scores greater than a preset threshold value as suspected positive samples.

Here, the value of the preset threshold value is not particularly limited in the present specification, which may be flexibly configured by one of ordinary skill in the art according to actual needs.

After the negative samples that have risk scores greater than the preset threshold value have been screened out from the original negative samples in the training sample set, the modeler may filter these screened negative samples as suspected positive samples, so as to improve the classifying accuracy of the positive and negative samples in the training sample set.

For example, two manners illustrated below may be used by the modeler to complete the filtering of the negative samples that have risk scores greater than the preset threshold value.

In one illustrated embodiment, the modeler may directly delete these negative samples that have risk scores greater than the preset threshold value from the original training sample set, thereby filtering out these suspected positive samples in the above training sample set.

In the other illustrated embodiment, deletion of samples is not be used. Instead, those negative samples that have risk scores greater than the preset threshold value are re-classified as suspected positive samples. A weight may be set for a loss function corresponding to the suspected positive samples, wherein this weight is less than a weight of the loss function corresponding to the original positive samples.

In exemplary applications, those negative samples may also not be re-classified as suspected positive samples. Instead, these negative samples are directly re-classified as positive samples. A weight may be set for a loss function corresponding to these re-classified positive samples, wherein this weight is equal to the weight of the loss function corresponding to the original positive samples. For example, the weight of the loss function corresponding to these re-classified positive samples and the weight of the loss function corresponding to the original positive samples are all set to be one.

Here, when a supervised machine learning model is being trained, two different loss functions are typically used to describe fitting errors between positive samples and corresponding sample labels and between negative samples and corresponding sample labels, respectively. Therefore, the target equation of the supervised machine learning model may typically be represented by the following equation:

$$\sum_{y_i=1} l(y_i, g(x_i)) + \sum_{y_i=-1} l(y_i, g(x_i))$$

where, in the above equation: $g(x_i)$ is a function expression of a machine learning model that ultimately needs to be trained, which indicates a prediction result by the trained model for a training sample $x_i$ (i.e., the ultimately output of a risk score); $\sum_{y_i=1} l(y_i, g(x_i))$ indicates a loss function corresponding to positive samples (samples that are classified with 1), which is used for representing an error loss between the prediction result $g(x_i)$ by the model for a positive sample and a true mark $y_i=1$; and $\Sigma_{y_i=-1} l(y_i, g(x_i))$ indicates a loss function corresponding to negative samples (samples that are classified with −1), which is used for representing an error loss between the prediction result $g(x_i)$ by the model for a negative sample and a true mark $y_i=-1$.

Here, the type of the above loss function $l(y_i, g(x_i))$ is not particularly limited in the present specification. For example, in an exemplary application, a common log-loss function or hinge-loss function may be selected.

Here, when the above loss function $l(y_i, g(x_i))$ is a log-loss function, it can be expressed as:

$$\text{log-loss}\{l(y_i,g(x_i))=\log(1+\exp(-y_i g(x_i)))\}; \text{ and}$$

when the above loss function $l(y_i, g(x_i))$ is a hinge-loss function, it can be expressed as:

$$\text{hinge-loss}\{l(y_i,g(x_i))=\max\{0,1-y_i g(x_i)\}\}.$$

In the present specification, since the classified suspected positive samples are still involved in the model training, it is equivalent that the training samples in the training sample set are classified into three types, i.e., "positive samples," "negative samples," and "suspected positive samples." In this case, when constructing the target equation of the above model, the modeler may construct a loss function for each of the above three types of training samples, respectively. The modeler may configure a weight for the loss function corresponding to the positive samples and for the loss function corresponding to the suspected positive samples, respectively, such that the weight for the loss function corresponding to the suspected positive samples is less than the weight of the loss function corresponding to the original positive samples.

In this case, the target equation of the above supervised machine learning model may be represented by the following equation:

$$C_+ \sum_{y_i=1} l(y_i, g(x_i)) + C_- \sum_{y_i=-2} l(y_i, g(x_i)) + \sum_{y_i=-1} l(y_i, g(x_i))$$

$C_+$ represents a weight configured for the loss function corresponding to the suspected positive samples; and $C_-$ represents a weight configured for the loss function corresponding to the original positive samples, wherein the value of $C_+$ is less than that of $C_-$. For example, in an exemplary application, the value of $C_+$ may be set to be much smaller than that of $C_-$.

$\Sigma_{y_i=1} l(y_i, g(x_i))$ represents a loss function corresponding to the original positive samples (samples that are classified with 1), $\Sigma_{y_i=-1} l(y_i, g(x_i))$ represents a loss function corresponding to the original negative samples (samples that are classified with −1), and $\Sigma_{y_i=-2} l(y_i, g(x_i))$ represents a loss function corresponding to the suspected positive samples (samples that are classified with −2).

It should be noted that the loss function corresponding to the original negative samples may be configured with a weight or may not be configured with a weight, which is not particularly limited in the present specification.

For example, in an embodiment, the loss function corresponding to the original negative samples may also be configured with a weight that is equal to the weight of the loss function corresponding to the original positive samples. In this case, the target equation of the above supervised machine learning model may be represented by the following equation:

$$C_+ \sum_{y_i=1} l(y_i, g(x_i)) + C_- \sum_{y_i=-2} l(y_i, g(x_i)) + C_+ \sum_{y_i=-1} l(y_i, g(x_i))$$

It should be further noted that classifying positive samples as 1, classifying negative samples as −1, and classifying suspected positive samples as −2 as illustrated above are merely exemplary and are not used to limit the present specification. In exemplary applications, the type of the labels used for classifying positive samples, negative samples, and suspected positive samples may be flexibly defined by one of ordinary skill in the art.

In the present specification, by configuring a relatively small weight for the loss function corresponding to the suspected positive samples, the contribution by the suspected positive samples to output results of the trained model may be reduced, thereby indirectly achieving the goal of filtering out the suspected positive samples in the training sample set.

In exemplary applications, the weight configured for the loss function corresponding to the suspected positive samples just needs to be smaller than the weight configured for the loss function corresponding to the original positive samples, which is not particularly limited in the present specification.

For example, in one illustrated embodiment, the risk score output by the risk model is typically used for representing a probability at which a risk occurs and is a floating-point number between 0 and 1. Therefore, a risk score of a suspected positive sample may be used as a weight of the loss function corresponding to the suspected positive sample, while the weight of the loss function corresponding to the original positive sample is set to be 1. It should be noted that, since different suspected positive samples may have different risk scores, a weight of the loss function may also be different when the loss function is used to train different suspected positive samples.

In the present specification, after the negative samples in the original training sample set that have risk scores greater than the preset threshold value have been filtered in the above-illustrated embodiments, the modeler may re-train the supervised machine learning model based on the original positive samples, the suspected positive samples, and the original negative samples in the filtered training sample set. Here, exemplary training processes will not be elaborated in the present specification.

After the above supervised machine learning model has been re-trained based on the filtered training sample set, the modeler may deploy this model in a risk control system to assess risks of daily online transactions of users based on this model and to score the daily online transactions of users to obtain risk scores. The model is then used to determine if the transactions have risks based on the obtained risk scores.

For example, in implementations, the risk control system may collect users' online transaction data, extract transaction characteristics in a plurality of dimensions from the online transaction data to construct prediction samples, input the prediction samples into the model for risk assessment to obtain risk scores, and then compare the risk scores with a preset risk threshold value to determine whether the transactions involve risks. If the risk scores are greater than the risk threshold value, the risk control system may decide that the transactions are risky transactions and may directly terminate the transactions or to perform further verification on identities of the users. If the verification is successful, the transactions may be executed. Otherwise, the transactions may be terminated.

In the above embodiments, the training sample set comprises a large number of positive samples and unlabel samples in the present specification. The conventional model training process is based on pu-learning to screen out reliable negative samples from the unlabel samples, and then perform supervised machine learning based on the positive samples and reliable negative samples. Instead, in the present specification, samples with risk labels in a training sample set are classified as positive samples and samples without risk labels in the training sample set are classified as negative samples. A supervised machine learning model is trained based on the classified positive samples and negative samples. The risk of the negative samples is assessed respectively based on the trained model to obtain risk scores for the negative samples. Negative samples in the training sample set that have a risk score greater than a preset threshold value are filtered as suspected positive samples. The supervised machine learning model is re-trained based on the positive and negative samples in the filtered training sample set.

On the one hand, suspected positive samples in the negative samples in the training sample set can be found and filtered out, which improves the classifying accuracy of the positive and negative samples in the training sample set.

On the other hand, the positive and negative samples in the filtered training sample set are used to re-train the model, which is favorable for improving the performance of the trained model.

Figure 2:
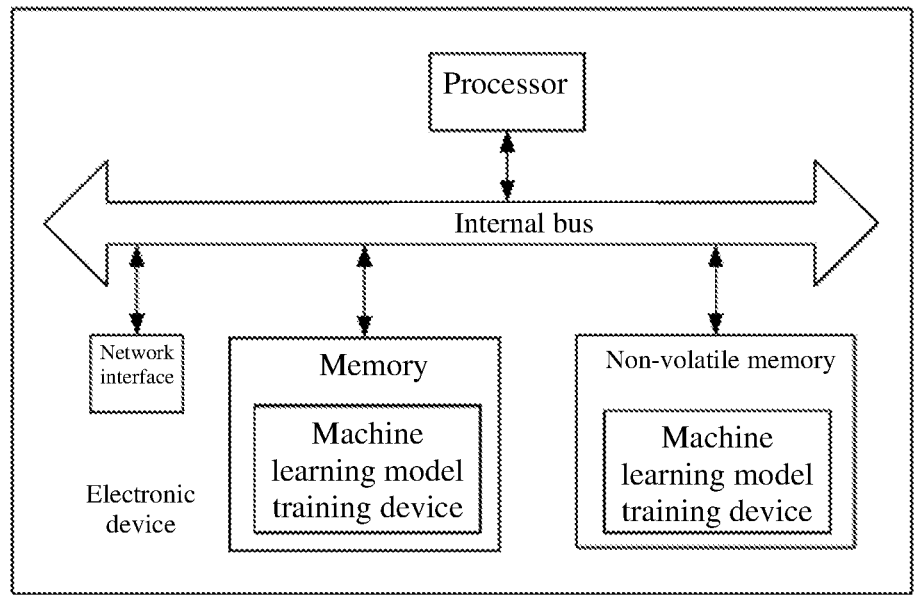
FIG. 2 is a hardware structural diagram of an electronic device that includes a supervised machine learning model device according to some embodiments of the present specification.

Corresponding to the above method embodiments, the present specification further provides embodiments of a supervised machine learning model training device. The embodiments of the supervised machine learning model training device according to the present specification may be applied to an electronic device. The device embodiments may be implemented through software or may also be implemented through hardware or a combination of software and hardware. For example, in the software implementation, a device in the logical sense is formed by a processor of an electronic device reading corresponding computer program instructions from a non-volatile memory into a cache for execution. From a hardware perspective, FIG. 2 illustrates a hardware structural diagram of the electronic device where the supervised machine learning model training device is embodied according to the present specification. In addition to the processor, memory, network interface and non-volatile memory shown in FIG. 2, the electronic device in the embodiments may typically comprise other hardware according to exemplary functions of the electronic device, which will not be elaborated again.

Figure 3:
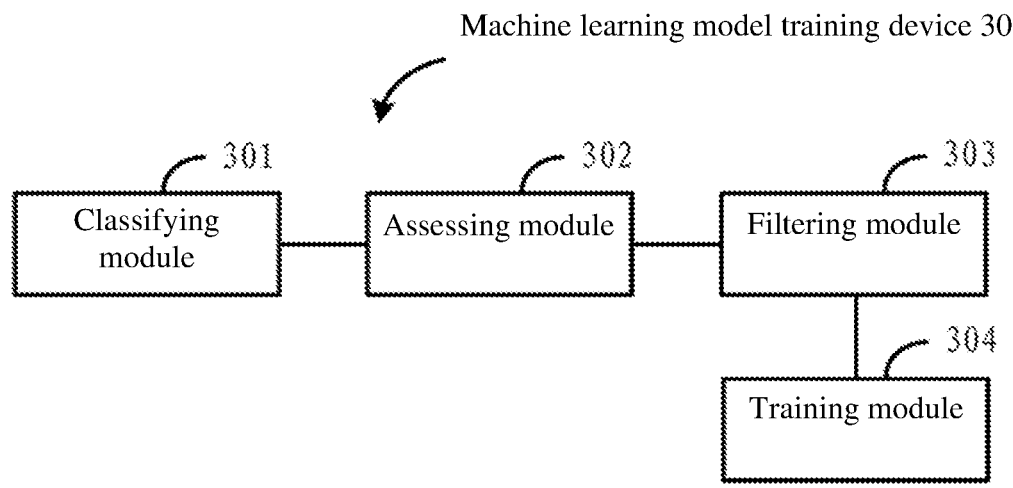
FIG. 3 is a logical block diagram of a supervised machine learning model device according to some embodiments of the present specification.

FIG. 3 is a block diagram of a supervised machine learning model training device according to an exemplary embodiment of the present specification.

Referring to FIG. 3, the supervised machine learning model training device 30 may be applied to the electronic device shown in FIG. 2. The supervised machine learning model training device 30 comprises: a classifying module 301, an assessing module 302, a filtering module 303 and a training module 304.

The classifying module 301 is configured to classify samples with risk labels in a training sample set as positive samples and classify samples without risk labels in the training sample set as negative samples.

The assessing module 302 is configured to train a supervised risk model based on the classified positive samples and negative samples, and assess a risk of the negative samples respectively based on the trained model to obtain risk scores.

The filtering module 303 is configured to identify and filter negative samples in the training sample set that have risk scores greater than a preset threshold value and re-classify the one or more negative samples in the training sample set as re-classified positive samples to generate an updated training sample set from the training sample set.

The training module 304 is configured to re-train the supervised risk model based on the positive and negative samples in the filtered training sample set.

In some embodiments, the filtering module 303 is configured to: delete the negative samples in the updated training sample set that have risk scores greater than a preset threshold value.

In some embodiments, the filtering module 303 is configured to: re-classify the negative samples in the training sample set that have risk scores greater than a preset threshold value as positive samples.

In some embodiments, the training module 304 is further configured to: configure weights for loss functions corresponding to the re-classified positive samples and original positive samples in the training sample set, respectively, wherein a weight of the loss function corresponding to the re-classified positive samples is smaller than a weight of the loss function corresponding to the original positive samples; and train the supervised risk model based on the re-classified positive samples, the original positive samples in the training sample set and the remaining negative samples in the training sample set.

In some embodiments, the risk scores represent probabilities at which a risk occurs; and the filtering module 303 is further configured to: after re-classifying the negative samples that have risk scores greater than the preset threshold value as re-classified positive samples, configure the risk scores of the negative samples as the weights of the loss function corresponding to the re-classified positive samples, and set the weight of the loss function corresponding to the original positive samples to be 1.

In some embodiments, the assessing module 302 is further configured to: construct a prediction sample based on online data; and assess a risk of the prediction sample based on the re-trained model to obtain a risk score.

The implementation processes of corresponding steps in the above-described method can be referenced for detailed description of implementation processes of functions and roles of the units of the above-described device, which will not be elaborated by the present specification.

Since the device embodiments substantially correspond to the method embodiments, the description of parts of the method embodiments can be referenced for relevant parts of the device embodiments. The above-described device embodiments are merely exemplary, wherein the units described as separate parts may or may not be physically separated, and the parts illustrated as units may or may not be physical units, i.e., they can be located at one place or distributed over a plurality of network units. The objectives of the solutions of the present specification can be achieved by selecting some or all of the modules as needed, which can be understood and implemented by one of ordinary skill in the art without creative effort.

The systems, devices, modules or units set forth in the foregoing embodiments may be achieved, for example, by computer chips or entities, or by products with certain functions. A typical implementation device is a computer. An exemplary form of the computer may be a personal computer, a laptop computer, a cell phone, a camera phone, a smart phone, a PDA (personal digital assistant), a media player, a navigation device, an email sending and receiving device, a game console, a tablet computer, a wearable device or a combination of any of these devices.

Corresponding to the above method embodiments, the present specification further provides embodiments of an electronic device, the electronic device comprising: a processor and a memory for storing machine executable instructions, wherein the processor and the memory are typically connected to each other via an internal bus. In other possible embodiments, the device may further comprise an external interface for communications with other devices or parts.

In some embodiments, by reading and executing the machine executable instructions stored in the memory and corresponding to a control logic of training of a machine learning model, the processor is caused to: classify samples with risk labels in a training sample set as positive samples and classify samples without risk labels in the training sample set as negative samples; train a supervised risk model based on the classified positive samples and negative samples, and assess a risk of the negative samples respectively based on the trained model to obtain risk scores for the negative samples; filter a negative samples in the training sample set that have risk scores greater than a preset threshold value; and re-train the supervised risk model based on the positive and negative samples in the filtered training sample set.

In some embodiments, by reading and executing the machine executable instructions stored in the memory and corresponding to a control logic of training of a supervised machine learning model, the processor is further caused to: delete the negative samples in the training sample set that have risk scores greater than the preset threshold value.

In some embodiments, by reading and executing the machine executable instructions stored in the memory and corresponding to a control logic of training of a supervised machine learning model, the processor is further caused to: re-classify the negative samples in the training sample set that have risk scores greater than a preset threshold value as positive samples.

In some embodiments, by reading and executing the machine executable instructions stored in the memory and corresponding to a control logic of training of a supervised machine learning model, the processor is further caused to: configure weights for loss functions corresponding to the re-classified positive samples and original positive samples in the training sample set, respectively, wherein a weight of the loss function corresponding to the re-classified positive samples is smaller than a weight of the loss function corresponding to the original positive samples; and train the supervised risk model based on the re-classified positive samples, the original positive samples in the training sample set and the remaining negative samples in the training sample set.

In some embodiments, by reading and executing the machine executable instructions stored in the memory and corresponding to a control logic of training of a supervised machine learning model, the processor is further caused to: after re-classifying the negative samples that have risk scores greater than the preset threshold value as re-classified positive samples, configure the risk scores of the re-classified positive samples as the weight of the loss function corresponding to the re-classified positive samples, and set the weight of the loss function corresponding to original negative samples to be 1.

In some embodiments, by reading and executing the machine executable instructions stored in the memory and corresponding to a control logic of training of a supervised machine learning model, the processor is further caused to: construct a prediction sample based on online data; and assess a risk of the prediction sample based on the re-trained model to obtain a risk score.

The implementation processes of corresponding steps in the above-described method can be referenced for detailed description of implementation processes of functions and roles of the units of the above-described device, which will not be elaborated by the present specification.

Since the device embodiments substantially correspond to the method embodiments, the description of parts of the method embodiments can be referenced for relevant parts of the device embodiments. The above-described device embodiments are merely exemplary, wherein the units described as separate parts may or may not be physically separated, and the parts illustrated as units may or may not be physical units, i.e., they can be located at one place or distributed over a plurality of network units. The objectives of the solutions of the present specification can be achieved by selecting some or all of the modules as needed, which can be understood and implemented by one of ordinary skill in the art without creative effort.

The above-described is only preferred embodiments of the present specification, which are not used to limit the present specification. Any modification, equivalent substitution, or improvement made within the spirit and principle of the present specification shall be encompassed by the claims of the present specification.

What is claimed is:

1. A machine learning model training method, comprising:

classifying samples having risk labels in a training sample set as positive samples and classifying samples without risk labels in the training sample set as negative samples;

training a risk model with a machine learning method based on the positive samples and the negative samples;

obtaining a risk score for each of the negative samples based on the trained risk model;

identifying one or more negative samples in the training sample set that have a risk score greater than a preset threshold value;

re-classifying the one or more negative samples in the training sample set as re-classified positive samples to generate an updated training sample set from the training sample set;

configuring weights for loss functions corresponding to the re-classified positive samples and the positive samples in the training sample set, respectively, wherein a weight of the loss function corresponding to the re-classified positive samples is smaller than a weight of the loss function corresponding to the positive samples; and re-training the risk model with the machine learning method based on the updated training sample set including the re-classified positive samples, the positive samples in the training sample set, and remaining negative samples in the training sample set, wherein the risk scores represent probabilities at which a risk occurs, and the method further comprises:

after re-classifying the negative samples that have a risk score greater than the preset threshold value as the re-classified positive samples, configuring the risk scores of the re-classified positive samples as the weights of the loss function corresponding to the re-classified positive samples, and setting the weight of the loss function corresponding to original negative samples to be one.

2. The method of claim 1, further comprising:
deleting from the updated training sample set the one or more negative samples that have a risk score greater than the preset threshold value; and
re-training the risk model based on the positive samples and remaining negative samples in the training sample set.

3. The method of claim 1, further comprising:
constructing a prediction sample based on online data; and
obtaining a risk score of the prediction sample based on the re-trained model.

4. The method of claim 1, wherein the loss functions comprise one of a log-loss function or a hinge-loss function.

5. The method of claim 1, further comprising:
obtaining a risk score for online transaction data based on the re-trained model;
determining whether the risk score for online transaction data is greater than a risk threshold; and
in response to determining that the risk score for online transaction data is greater than the risk threshold, determining that an online transaction corresponding to the online transaction data is risky.

6. The method of claim 5, further comprising:
in response to determining that the online transaction corresponding to the online transaction data is risky, terminating the online transaction.

7. The method of claim 5, further comprising:
in response to determining that the online transaction corresponding to the online transaction data is risky, requesting verification of a user identity for the online transaction before approving the online transaction.

8. An apparatus comprising:
at least one processor; and
a memory communicatively connected to the at least one processor, wherein the memory stores instructions executable by the at least one processor to cause the at least one processor to perform operations comprising:
classifying samples having risk labels m a training sample set as positive samples and classifying samples without risk labels in the training sample set as negative samples;
training a risk model with a machine learning method based on the positive samples and the negative samples;
obtaining a risk score for each of the negative samples based on the trained risk model;
identifying one or more negative samples in the training sample set that have a risk score greater than a preset threshold value;
re-classifying the one or more negative samples in the training sample set that have a risk score greater than the preset threshold value as re-classified positive samples to generate an updated training sample set from the training sample set;
configuring weights for loss functions corresponding to the re-classified positive samples and the positive samples in the training sample set, respectively, wherein a weight of the loss function corresponding to the re-classified positive samples is smaller than a weight of the loss function corresponding to the positive samples; and
re-training the risk model with the machine learning method based on the updated training sample set including the re-classified positive samples, the positive samples in the training sample set, and remaining negative samples in the training sample set,
wherein the risk scores represent probabilities at which a risk occurs, and the operations further comprise:
after re-classifying the negative samples that have a risk score greater than the preset threshold value as the re-classified positive samples, configuring the risk scores of the re-classified positive samples as the weights of the loss function corresponding to the re-classified positive samples, and setting the weight of the loss function corresponding to original negative samples to be one.

9. The apparatus of claim 8, wherein the operations further comprise:
deleting from the updated training sample set the one or more negative samples that have a risk score greater than the preset threshold value; and
re-training the risk model based on the positive samples and remaining negative samples in the training sample set.

10. The apparatus of claim 8, wherein the operations further comprise:
constructing a prediction sample based on online data; and
obtaining a risk score of the prediction sample based on the re-trained model.

11. The apparatus of claim 8, wherein the loss functions comprise one of a log-loss function or a hinge-loss function.

12. The apparatus of claim 8, wherein the operations further comprise:
obtaining a risk score for online transaction data based on the re-trained model;
determining whether the risk score for online transaction data is greater than a risk threshold; and
in response to determining that the risk score for online transaction data is greater than the risk threshold, determining that an online transaction corresponding to the online transaction data is risky.

13. The apparatus of claim 12, wherein the operations further comprise:
in response to determining that the online transaction corresponding to the online transaction data is risky, terminating the online transaction.

14. The apparatus of claim 12, wherein the operations further comprise:
in response to determining that the online transaction corresponding to the online transaction data is risky, requesting verification of a user identity for the online transaction before approving the online transaction.

15. A non-transitory computer-readable storage medium storing instructions executable by a processor to cause the processor to perform operations comprising:
classifying samples having risk labels in a training sample set as positive samples and classifying samples without risk labels in the training sample set as negative samples;
training a risk model with a machine learning method based on the positive samples and the negative samples;
obtaining a risk score for each of the negative samples based on the trained risk model;
identifying one or more negative samples in the training sample set that have a risk score greater than a preset threshold value;
re-classifying the one or more negative samples in the training sample set that have a risk score greater than the preset threshold value as re-classified positive samples to generate an updated training sample set from the training sample set; and configuring weights for loss functions corresponding to the re-classified positive samples and the positive samples in the training sample set, respectively, wherein a weight of the loss function corresponding to the re-classified positive samples is smaller than a weight of the loss function corresponding to the positive samples; and re-training the risk model with the machine learning method based on the updated training sample set including the re-classified positive samples, the positive samples in the training sample set, and remaining negative samples in the training sample set, wherein the risk scores represent probabilities at which a risk occurs, and the operations further comprise:

after re-classifying the negative samples that have a risk score greater than the preset threshold value as the re-classified positive samples, configuring the risk scores of the re-classified positive samples as the weights of the loss function corresponding to the re-classified positive samples, and setting the weight of the loss function corresponding to original negative samples to be one.

16. The non-transitory computer-readable storage medium of claim 15, wherein the operations further comprise:

deleting from the updated training sample set the one or more negative samples that have a risk score greater than the preset threshold value; and re-training the risk model based on the positive samples and remaining negative samples in the training sample set.

17. The non-transitory computer-readable storage medium of claim 15, wherein the operations further comprise:

constructing a prediction sample based on online data; and obtaining a risk score of the prediction sample based on the re-trained model.

18. The non-transitory computer-readable storage medium of claim 15, wherein the operations further comprise:

obtaining a risk score for online transaction data based on the re-trained model;

determining whether the risk score for online transaction data is greater than a risk threshold; and in response to determining that the risk score for online transaction data is greater than the risk threshold, determining that an online transaction corresponding to the online transaction data is risky.

19. The non-transitory computer-readable storage medium of claim 18, wherein the operations further comprise:

in response to determining that the online transaction corresponding to the online transaction data is risky, terminating the online transaction.

20. The non-transitory computer-readable storage medium of claim 18, wherein the operations further comprise:

in response to determining that the online transaction corresponding to the online transaction data is risky, requesting verification of a user identity for the online transaction before approving the online transaction.

* * * * *